US012561440B2

(12) United States Patent
Ramakrishna Reddy et al.

(10) Patent No.: US 12,561,440 B2
(45) Date of Patent: Feb. 24, 2026

(54) INTEGRITY VALIDATION OF MANAGEMENT DEVICES

(71) Applicant: HEWLETT PACKARD ENTERPRISE DEVELOPMENT LP, Spring, TX (US)

(72) Inventors: Dilip Kumar Ramakrishna Reddy, Bangalore (IN); Kenneth J. Geer, Aurburn, CA (US); Stephen B. Lyle, Granite Bay, CA (US); Shiva R. Dasari, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 282 days.

(21) Appl. No.: 18/362,151

(22) Filed: Jul. 31, 2023

(65) Prior Publication Data

US 2025/0045398 A1     Feb. 6, 2025

(51) Int. Cl.
*G06F 21/57* (2013.01)
*G06F 21/12* (2013.01)
*G06F 21/60* (2013.01)

(52) U.S. Cl.
CPC ............ *G06F 21/57* (2013.01); *G06F 21/125* (2013.01); *G06F 21/602* (2013.01)

(58) Field of Classification Search
CPC ...... G06F 21/57; G06F 21/125; G06F 21/602; G06F 21/575; G06F 21/51; G06F 21/52; G06F 21/50
See application file for complete search history.

(56) References Cited

U.S. PATENT DOCUMENTS

| | | | | |
|---|---|---|---|---|
| 9,286,485 B2 * | 3/2016 | Kotani | ................. | G06F 21/606 |
| 9,342,696 B2 * | 5/2016 | Imtiaz | ................. | G06F 21/575 |
| 9,819,496 B2 * | 11/2017 | Lin | ................. | H04L 63/062 |
| 10,798,108 B2 * | 10/2020 | Snyder, II | ............. | H04L 67/141 |
| 11,604,671 B2 * | 3/2023 | Tsirkin | .................. | G06F 13/32 |
| 12,113,823 B2 * | 10/2024 | Hu | ................. | G06F 1/3206 |
| 2014/0181894 A1 * | 6/2014 | Von Bokern | ........... | H04L 63/20 726/1 |
| 2016/0125187 A1 * | 5/2016 | Oxford | ............... | H04L 63/0442 713/2 |
| 2017/0180391 A1 * | 6/2017 | Hinchliffe | ............. | H04L 63/123 |
| 2018/0285560 A1 * | 10/2018 | Negi | ................. | G06F 21/72 |

(Continued)

OTHER PUBLICATIONS

Wikipedia, Mutual authentiation downloaded Jul. 10, 2023 (8 pages).

(Continued)

*Primary Examiner* — Joseph P Hirl
*Assistant Examiner* — Aayush Aryal
(74) *Attorney, Agent, or Firm* — Trop, Pruner & Hu, P.C.

(57) ABSTRACT

In some examples, a security processor receives, from a first management device, measurement data of one or more second management devices. The measurement data is computed at the one or more second management devices based on information in the one or more second management devices and sent from the one or more second management devices to the first management device. The security processor stores the measurement data in a secure storage of the security processor, and provides a representation of the measurement data to validate an integrity of the information in the one or more second management devices.

14 Claims, 5 Drawing Sheets

(56) References Cited

U.S. PATENT DOCUMENTS

| | | | | |
|---|---|---|---|---|
| 2019/0172047 A1* | 6/2019 | Tan | ........................ | H04W 4/80 |
| 2020/0110869 A1* | 4/2020 | Domke | .................. | G06F 21/44 |
| 2020/0175170 A1* | 6/2020 | Diamant | .............. | H04L 9/3234 |
| 2021/0232688 A1* | 7/2021 | Luciani | ................ | G06F 21/121 |
| 2021/0342169 A1* | 11/2021 | Heinrich | ............ | G06F 13/4027 |
| 2022/0150260 A1* | 5/2022 | Zhang | .................... | G06F 21/73 |
| 2023/0342446 A1* | 10/2023 | Reddy | .................. | G06F 21/575 |

OTHER PUBLICATIONS

Pagemap from the userspace perspective downloaded Jul. 10, 2023 (3 pages).
DMTF, Security Protocol and Data Model (SPDM) Architecture White Paper, Version 1.1.0, Jan. 4, 2022 (53 pages).
Alexander S. Gillis, Trusted Platform Module (TPM) downloaded Jul. 5, 2023 (3 pages).
TPM fundamentals, Mar. 9, 2023 (7 pages).
Trusted Computing Group, TCG Server Management Domain Firmware Profile Specification, May 1, 2020 (53 pages).

* cited by examiner

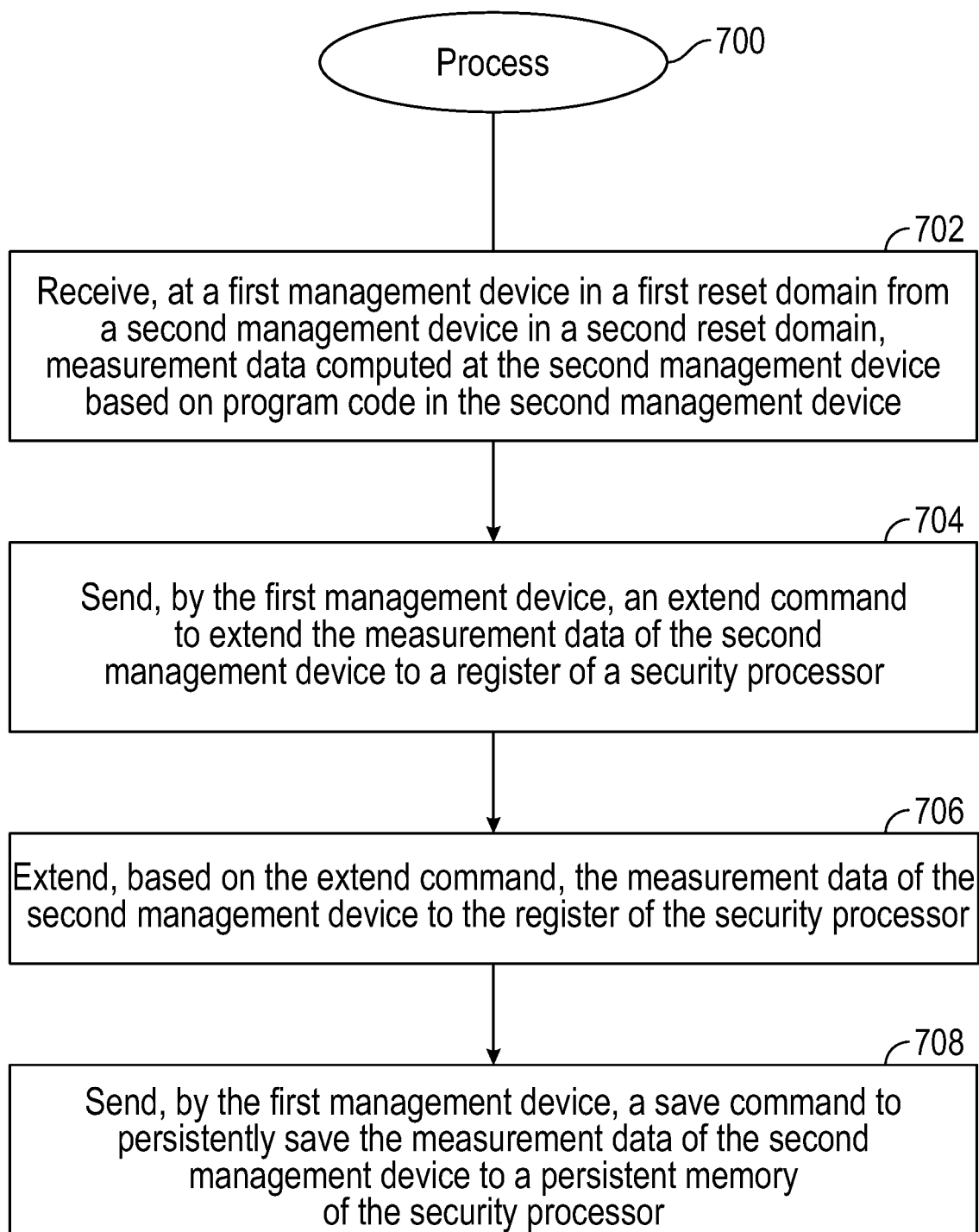

700

Process

702

Receive, at a first management device in a first reset domain from a second management device in a second reset domain, measurement data computed at the second management device based on program code in the second management device

704

Send, by the first management device, an extend command to extend the measurement data of the second management device to a register of a security processor

706

Extend, based on the extend command, the measurement data of the second management device to the register of the security processor

708

Send, by the first management device, a save command to persistently save the measurement data of the second management device to a persistent memory of the security processor

FIG. 7

INTEGRITY VALIDATION OF MANAGEMENT DEVICES

BACKGROUND

A computer system includes a central processing unit (CPU) to execute application programs, an operating system (OS), firmware, and other types of machine-readable instructions. The computer system may also include one or more management devices, separate from the CPU, that perform management tasks of the computer system.

BRIEF DESCRIPTION OF THE DRAWINGS

Some implementations of the present disclosure are described with respect to the following figures.

FIG. 7 is a flow diagram of a process according to some examples.

Figure 1:
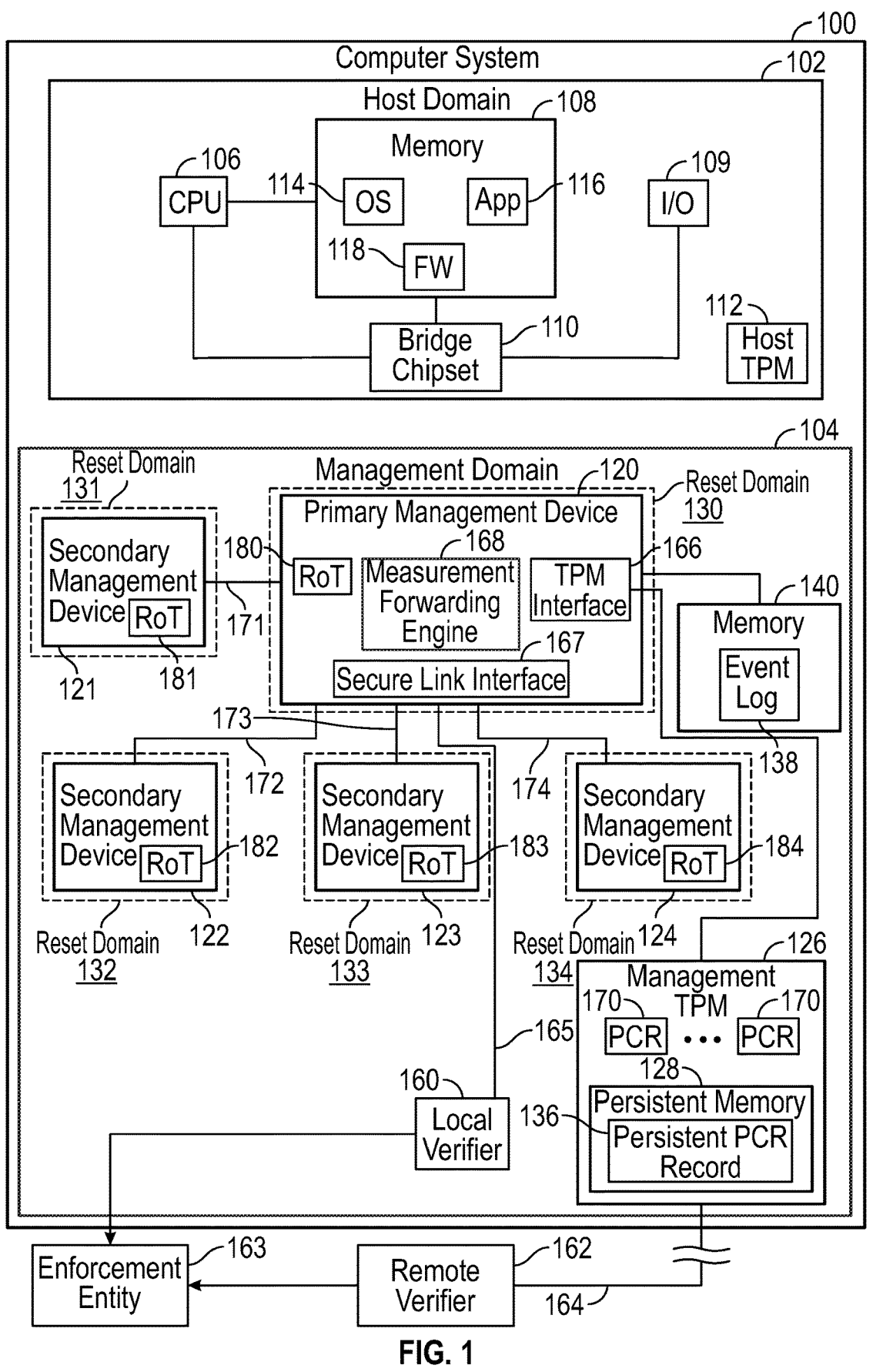
FIG. 1 is a block diagram of an arrangement that includes a computer system with a host domain and a management domain that has a security processor to validate integrity of management devices in the management domain, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A computer system can include a host domain and a management domain. The host domain includes electronic components to perform operational functionalities of the computer system. The "operational functionalities" of the computer system include target functions that the computer system is deployed to perform, such as in response to requests from clients (e.g., humans, programs, or machines). For example, if the computer system is a server computer, then the operational functionalities can include application or web server operations, database server operations, and so forth. If the computer system is a communication node such as a router or switch, then the operational functionalities can include data communications. If the computer system is a storage system, then the operational functionalities can include data storage.

The electronic components of the computer system include a central processing unit (CPU), a memory, input/output (I/O) device(s), and other components. The CPU includes a main processor (or multiple main processors) of the computer system, and the CPU can execute machine-readable instructions such as application programs, an operating system (OS), firmware such as Basic Input/Output System (BIOS) code, and the like.

The management domain of the computer system includes management devices to perform management operations of the computer system. Examples of management devices include any or some combination of the following: a baseboard management controller (BMC), a management processor, integrated circuit or programmable logic devices (such as complex programmable logic devices (CPLDs), field programmable gate arrays (FPGAs), or other types of logic devices), system on a chip (SOC), or other types of management devices. The operations performed in the management domain can be independent of the operations in the host domain. The management devices in the management domain are separate from the CPU in the host domain of the computer system.

In some examples, a security processor can be provided in each of the host domain and the management domain to support trusted operations in the computer system. The security processor in the host domain can be referred to as a host security processor, and the security processor in the management domain can be referred to as a management security processor. A security processor can support attestation of a management device to ensure trustworthiness of program code (including machine-readable instructions such as firmware, software, or other types of machine-readable instructions) executed in the management device. A management device can provide, to the security processor, a measurement value based on application of an integrity measurement on the program code. The security processor saves the measurement value, and the saved measurement value is accessible by another entity to perform the attestation.

If the management domain includes multiple different management devices, then ensuring trusted operations in the management domain may be challenging. For example, deploying multiple management security processors in the management domain that connect to the respective different management devices for ensuring trustworthiness of the management devices results in increased product costs and complexity.

Additionally, the different management devices of the management domain may be in different reset domains. A "reset domain" refers to a domain that includes one or more electronic components that can be reset without resetting any electronic component in another reset domain. Resetting an electronic component can refer to causing the electronic component to transition to an initial state, such as by performing a power cycle in which power is removed and then re-applied to the electronic component, or by activating a reset control input of the electronic component, or by any other reset technique. If a management device in a given reset domain is reset, it may not be possible for the security processor to obtain a correct measurement value of the management device that is reset and/or of other management devices in other reset domains after the reset of the management device (explained further below).

In accordance with some implementations of the present disclosure, a shared security processor is able to support secure operations (such as based on attestations) of multiple different management devices in a management domain. In some examples of the present disclosure, one of the different management devices is designated a primary management device that interacts directly with the security processor. Other management devices (referred to as "secondary management devices") in the management domain are able to provide measurement values to the primary management device. The primary management device provides the measurement values of the secondary management devices to the security processor for use in verifying secure operations (such as based on attestations of the measurement values) of the secondary management devices.

Note that the management devices in the management domain may be in different reset domains in which a reset of a first management device in a first reset domain does not result in any other another management device being reset in another reset domain. The different reset domains of a computer system may include different system boards and/or different system chassis. A system board can be a circuit board with electronic components mounted to the circuit board. A system chassis can include a part of the computer system housed in a separate housing frame. For example, a multi-server system may include multiple computer servers each housed in a separate housing frame. More generally, the different reset domains of the computer system are domains of electronic components that can be independently reset (e.g., electronic components in a first reset domain can be reset independently of electronic components in a second reset domain).

In accordance with some examples of the present disclosure, in response to a reset of any management device in any of the reset domains, the security processor is able to obtain a refreshed measurement value of the reset management device and/or of any other management devices in other reset domains.

FIG. 1 is a block diagram of an example computer system 100 that includes a host domain 102 and a management domain 104. The host domain 102 includes a CPU 106, a memory 108, input/output (I/O) devices 109, and a bridge chipset 110. The bridge chipset 110 includes one or more electronic chips and performs various functionalities, including interacting with the I/O devices 109, such as a display device, a network interface controller (NIC), a storage device, and so forth. In further examples, the bridge chipset 110 can be integrated into the CPU 106 or an integrated device that includes the CPU 106.

The CPU 106 can execute various different types of machine-readable instructions. In the example of FIG. 1, the memory 108 stores the following types of machine-readable instructions: an OS 114, an application program 116, and firmware 118. The machine-readable instructions can be loaded from the memory 108 for execution by the CPU 106.

The memory 108 can be implemented using one or more memory devices. Examples of memory devices can include any or some combination of the following: a dynamic random access memory (DRAM) device, a static random access memory (SRAM) device, a flash memory device, or any other type of memory device.

The bridge chipset 110 also allows electronic components in the host domain 102, such as the CPU 106, to communicate with management devices in the management domain 104.

The host domain 102 includes a host Trusted Platform Module (TPM) 112. A TPM is an example of a security processor that can perform various hardware-based, security functionalities. Although the present discussion refers to TPMs as examples of security processors, in other examples, other types of security processors can be used.

Examples of security functionalities that can be performed by a TPM can include any or some combination of the following: cryptographic computations, including applying cryptographic hash functions on information to derive hash values; key management and generation that generates keys used in security operations; secure storage of keys and other secret information; random number generation to generate random numbers; integrity measurement that generates or stores a measurement value provided by a target (where a target can include machine-readable instructions, a hardware component, or configuration information); or other security functionalities. Although a specific list of example security functionalities is provided above, in other examples, security processors can perform additional or alternative security functionalities.

The TPM may also include security mechanisms to make the TPM tamper-resistant, such that malicious programs would be unable to tamper with the security operations of the TPM. The TPM may be a hardware component or may be part of a virtual computing environment, such as a hypervisor, in some examples.

Note that if the computer system 100 has multiple system boards and/or multiple system chassis, there may be multiple instances of the CPU 106, the memory 108, the I/O devices 109, and the bridge chipset 110 in the corresponding system boards and/or system chassis.

The management domain 104 includes various different management devices, including a primary management device 120 and secondary management devices 121, 122, 123, and 124. The management devices 120 to 124 are programmable management devices since they are programmed with machine-readable instructions (e.g., firmware or software) to perform management tasks. Although a specific quantity of management devices is depicted in FIG. 1, it is noted that in different examples, a different quantity (2 or more) of management devices can perform different types of management operations. Examples of different management operations that can be performed by management devices are provided further below.

The different management devices 120 to 124 can be part of respective different reset domains. For example, the primary management device 120 is part of a reset domain 130, and the secondary management devices 121 to 124 are part of corresponding reset domains 131 to 134. Although the example of FIG. 1 shows each reset having a single management device, in other examples, a reset domain can include multiple management devices. In some examples, the reset domains can be part of respective different system boards, different system chassis, or other domains.

Each reset domain can include a corresponding independent clock source that generates one or more clock signals provided to electronic components in the reset domain. A clock signal is an oscillating signal of a specified frequency. An electronic component has a clock input that receives a clock signal, and the electronic component can operate according to the frequency of the clock signal. With independent clock sources in the different reset domains 130 to 134, a reset of electronic components in one reset domain does not cause a reset in any other reset domain.

The management domain 104 includes a management TPM 126, which is an example of a security processor in the management domain 104. The management TPM 126 can perform security functionalities for the management devices 120 to 124. Instead of providing multiple management TPMs (or more generally multiple security processors) for multiple different management devices, a shared TPM (126) can be used to provide security functionalities for multiple management devices that are part of different reset domains. Although FIG. 1 shows the management TPM 126 as a discrete device separate from the primary management device 120, in other examples, the management TPM 126 may be embedded in the primary management device 120. Alternatively, the management TPM 126 may be a virtual TPM within the primary management device 120.

The primary management device 120 is the management device that interacts directly with the management TPM 126. The secondary management devices 121 to 124 do not interact directly with the management TPM 126. Instead, the secondary management devices 121 to 124 send their measurement values (produced by integrity measurements) to the primary management device 120, which in turn provides the measurement values of each secondary management device to the management TPM 126.

Generally, integrity measurement refers to computing measurement values based on machine-readable instructions (e.g., firmware and software), information of hardware in a computer system, and configuration information regarding a configuration of the computer system 100. In the management domain 104, each management device 120 to 124 is able to generate measurement values based on integrity measurements applied on machine-readable instructions to be executed by the management device.

In some examples, when a management device starts (e.g., after a reset or a power cycle), machine-readable instructions such as firmware and software may be loaded for execution by the management device. Measurement values computed by an integrity measurement on the machine-readable instructions of the management device can include hash values computed from application of cryptographic hash functions on the machine-readable instructions (and possibly other information such as input data to the machine-readable instructions).

The measurement values are used in attestation to verify an integrity of the management device. The verification of the integrity of the management device may be performed by a local verifier 160 within the computer system 100 or a remote verifier 162 that is external of the computer system 100. The verification of machine-readable instructions executed by the target component allows the verifier (the local verifier 160 or the remote verifier 162) to confirm that the machine-readable instructions of the management device are trustworthy and have not been corrupted, such as by malware or due to an error in the computer system 100.

The remote verifier 162 can be connected over a management network 164 to the computer system 100 so that the remote verifier 162 can access the management TPM 126. The remote verifier 162 can include a computer, for example.

The local verifier 160 can be connected over a bus 165 to the primary management device 120. Alternatively, the local verifier 160 can be embedded in the primary management device 120. The local verifier 160 can include a controller in the management domain 104 or in another domain of the computer system 100.

For the management domain 104, the management TPM 126 is able to store measurement values from the management devices 120 to 124 so that a verifier (e.g., the local verifier 160 or the remote verifier 162) is able to attest the machine-readable instructions (e.g., firmware and/or software) executed by each management device 120-124.

The management TPM 126 includes various platform configuration registers (PCRs) 170. The primary management device 120 is able to issue various commands to the management TPM 126, such as commands according to the Trusted Platform Module Library, e.g., according to the TPM 2.0 Library Specification as published by the Trusted Computing Group (TCG). An example command that the primary management device 120 can issue to the management TPM 126 is an extend command (e.g., the TPM2_Extend command). The extend command includes a digest value (which is the measurement value from a management device) and a number (identifier) of a PCR that is to be updated with the digest value.

The PCRs 170 can be reset to an initial value (e.g., zero) when the management TPM 126 is reset. An extend command received by the management TPM 126 causes the management TPM 126 to perform an extend operation that calculates a cryptographic hash of a PCR's current information combined with the new data (the digest value). The management TPM 126 uses the result of the cryptographic hash as the new value stored in the PCR. More specifically, if the PCR contains a current value (Current PCR Value), then the new value (New PCR Value) to be stored to the PCR is computed according to Eq. 1 below:

$$\text{New } PCR \text{ Value} = H(\text{Digest Value} \| \text{Current } PCR \text{ Value}), \quad \text{(Eq. 1)}$$

where $H(\ )$ is a cryptographic hash function, and the $\|$ operator represents a concatenation. Examples of cryptographic hash functions include Secure Hash Algorithm (SHA) hash functions or other types of secure hash functions.

More generally, the PCRs 170 are examples of registers that can be included in a security processor to store values. A "register" can refer to any storage element (e.g., a memory, a buffer, a latch, etc.) that can hold a value.

The primary management device 120 includes a TPM interface 166 that is able to interact with the management TPM 126. For example, the TPM interface 166 can operate according to the TPM Software Stack (TSS) Specification, which provides an application programming interface (API) for accessing functions of the management TPM 126. In other examples, the primary management device 120 can include other types of security processor interfaces to interact with different types of security processors.

The primary management device 120 is connected by respective links 171 to 174 to the secondary management devices 121 to 124. Each link 171 to 174 can be a bus or another type of link.

Each management device includes a respective root of trust (RoT) engine that is a trusted component in the management device. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The primary management device 120 includes an RoT engine 180, the secondary management device 121 includes an RoT engine 181, the secondary management device 122 includes an RoT engine 182, the secondary management device 123 includes an RoT engine 183, and the secondary management device 124 includes an RoT engine 184. In some examples, an RoT engine can be implemented using hardware, such that the RoT engine cannot be compromised by an attacker. As a result, the RoT engine can be trusted to start up in a known valid state and to perform trusted operations.

The RoT engine in a respective management device computes a measurement value (e.g., by computing a hash value based on application of a cryptographic hash function on machine-readable instructions of the respective management device) executed on the management device. For example, if the machine-readable instructions include firmware, then the RoT engine can perform integrity measurements by successively computing measurement values based on successive segments of the firmware as the firmware segments are loaded for execution by the measurement device. More specifically, the RoT engine performs a first integrity measurement on a first segment of the firmware to be executed to produce a first measurement value, a second integrity measurement on a second segment of the firmware to be executed to produce a second measurement value, and so forth. As each measurement value is computed, the measurement value is provided to the management TPM 126 to be extended to a respective PCR 170.

The RoT engines 181 to 184 provide their respective measurement values to the primary management device 120 over the corresponding links 171 to 174. The primary management device 120 includes a secure link interface 167 that cooperates with a respective secure link interface (not shown) in a secondary management device (any of 121 to 124) to perform secure communications of measurement values over the respective link.

In some examples, the secure communications over the links 171 to 174 between the secondary management devices 121 to 124 and the primary management device 120 can be according to a secure communications protocol, such as a Security Protocol and Data Model (SPDM) security protocol, a Mutual Transport Layer Security (MTLS) protocol, or any other secure communications protocol that protects information transferred between devices from unauthorized access by an attacker or another authorized entity.

In response to receiving a measurement value from a secondary management device, a measurement forwarding engine 168 in the primary management device 120 uses the TPM interface 166 to issue an extend command to extend the measurement value to a corresponding PCR 170 of the management TPM 126. Additionally, the RoT engine 180 in the primary management device 120 can perform an integrity measurement to produce a measurement value. The primary management device 120 can also use the TPM interface 166 to issue an extend command to extend the measurement value for the primary management device 120 into a PCR 170 of the management TPM 126.

In accordance with some implementations of the present disclosure, the management TPM 126 is shared among multiple management devices (e.g., 120 to 124) in different reset domains 130 to 134. The measurement values for the management devices 120 to 124 that are stored in the PCRs 170 can be used in attestation of the management devices 120 to 124, such as by the local verifier 160 or the remote verifier 162.

The management TPM 126 also includes a persistent memory 128, which includes a one or more persistent memory devices such as flash memory devices, electrically erasable and programmable read-only memory devices (EEPROM), or other types of persistent memory devices. The persistent memory 128 can be used to store a persistent PCR record 136, which is a persistent representation of the content of measurement values in the PCRs 170. When power is removed from the management TPM 126, or when the management TPM 126 is reset, the PCRs can be initialized to an initial value, such as zero. However, the persistent PCR record 136 is maintained even if power is removed from the management TPM 126 or if the management TPM 126 is reset. Use of the persistent PCR record 136 is discussed further below.

Figure 2:
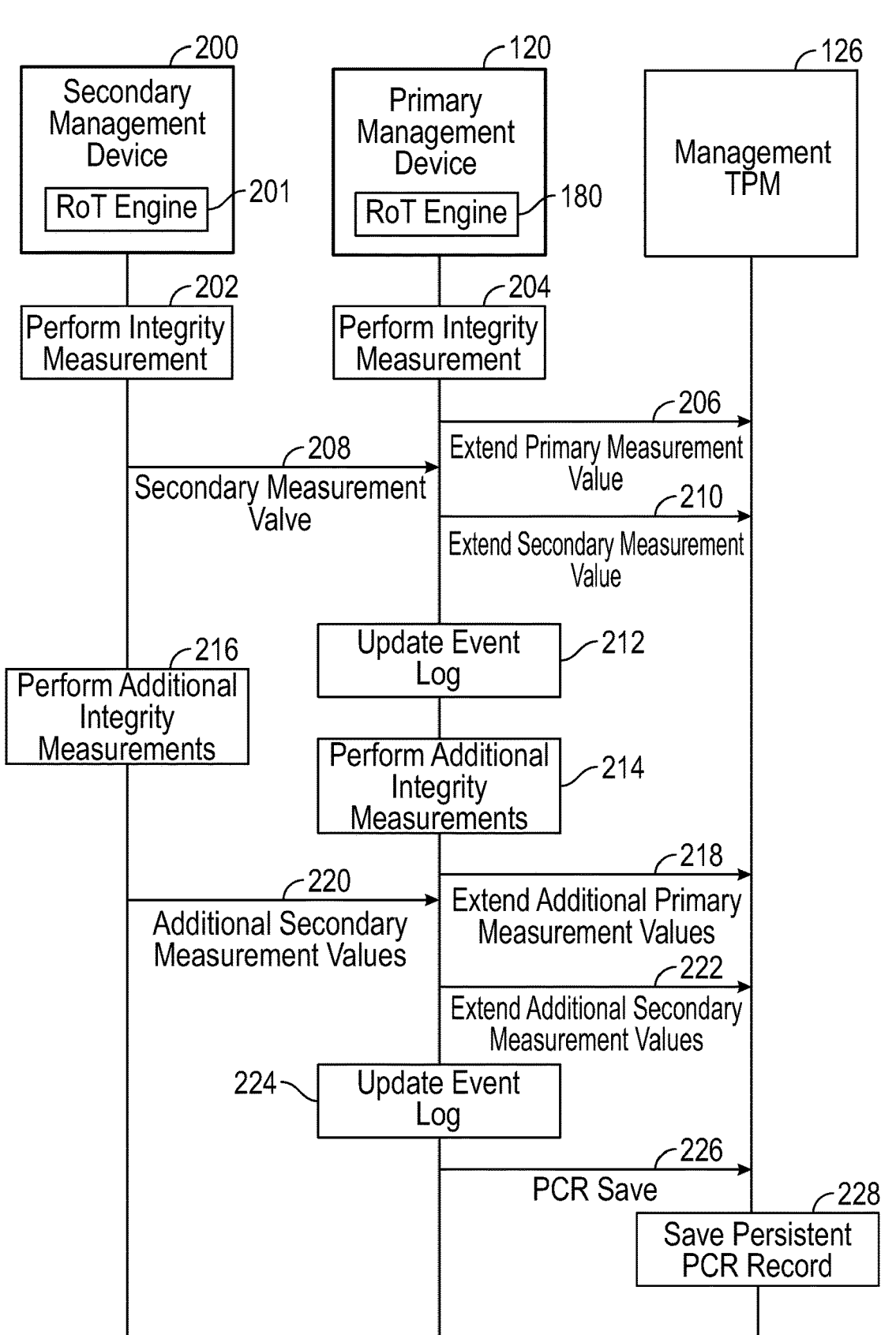
FIG. 2 is a flow diagram of a startup process according to some examples.

FIG. 2 is a flow diagram of a startup process that is performed by various components, including a secondary management device 200 (e.g., any one of 121 to 124), the primary management device 120, and the management TPM 126.

Although FIG. 2 shows just one secondary management device, it is noted that other secondary management devices can perform similar tasks as the secondary management device 200 of FIG. 2.

FIG. 2 shows a sequence of tasks performed by various components. In other examples, the tasks can be performed in a different order, some tasks can be omitted, and/or other tasks can be added.

The startup process can be triggered in response to power being applied to the computer system 100 (FIG. 1) after power was previously removed, or in response to a reboot or other type of reset of the computer system 100.

An RoT engine 201 (e.g., any of RoT engines 181 to 184) in the secondary management device 200 can perform (at 202) an integrity measurement of a first code segment (e.g., a first segment of firmware and/or software) that is to initially execute in the secondary management device 200 during startup. Similarly, the RoT engine 180 in the primary management device 120 performs (at 204) an integrity measurement of a first code segment that is to initially execute in the primary management device 120 during startup.

The primary management device 120 extends (at 206) a primary measurement value produced by the integrity measurement of the first code segment of the primary management device 120 to the management TPM 126. This primary measurement value can be provided as part of an extend command to extend the primary measurement value to a corresponding PCR 170 of the management TPM 126. The PCR 170 into which a primary measurement value for the primary management device 120 is to be extended is referred to as "PCR P" in the present example.

The RoT engine 201 in the secondary management device 200 sends (at 208) a secondary measurement value produced by the integrity measurement of the first code segment in the secondary management device 200 to the primary management device 120. In response, the measurement forwarding engine 168 of the primary management device 120 extends (at 210) the measurement value of the secondary management device 200 (such as in an extend command) to the management TPM 126 to a corresponding PCR 170 of the management TPM 126.

The PCR 170 into which a secondary measurement value for the secondary management device 200 is to be extended is referred to as "PCR S" in the present example.

In specific examples, the PCRs of the management TPM 126 to which measurement values of the primary management device 120 can be extended include PCRs 0, 1, 8, and 9, such as according to the TCG Server Management Domain Firmware Profile Specification. PCR P in such examples can be any of PCRs 0, 1, 8, and 9. In some examples, the measurement values of the secondary management devices can be extended into PCRs 2 and 3. PCR S in such examples can be any of PCRs 2 and 3. In other examples, different PCRs of the management TPM 126 can be used to store measurement values for respective management devices.

Note that a PCR can be divided into multiple segments, with the corresponding segments of the PCR ("PCR segments") assigned to corresponding different management devices. A PCR segment assigned to a given management device is used to store measurement values for the management device. A "PCR segment" can refer to a portion of the PCR that is less than the entirety of the PCR, or to the entirety of the PCR.

In addition to extending measurement values of the primary management device 120 and the secondary management device 200 to respective PCRs, the primary management device 120 also updates (at 212) an event log 138 with the measurement values and information identifying the entity associated with each measurement value. The entity associated with a measurement value in the event log 138 can be the primary management device 120 or a secondary management device. As measurement values are created at the primary management device 120 or received by the primary management device 120 from secondary management devices, additional entries are added to the event log 138. The entries of the event log 138 thus store successive measurement values produced by corresponding management devices and corresponding information identifying entities associated with the successive measurement values.

The event log 138 is stored in a memory 140 coupled to the primary management device 120. The memory 140 coupled to the primary management device 120 may be part of the primary management device 120 or may be external of the primary management device 120.

Note that a value stored in a PCR segment based on a measurement value represents a combination (composite) of multiple measurement values from a given management device, where the value stored in the PCR segment is derived according to Eq. 1 above in some examples. The value in the PCR segment represents a trust state up to the point that the PCR segment is read. Due to the nature of the extend process to update the PCR segment, it is not feasible to obtain the individual measurement values that make up the value in the PCR segment.

On the other hand, the event log 138 contains the individual measurement values for each management device. The event log 138 may be used to recover individual measurement values of each management device to recover from unexpected events, including resets of a management device (discussed further below).

Additional integrity measurements are performed (at 214) by the primary management device 120 to produce additional primary measurement values as additional code segments are executed in the primary management device 120. Additional integrity measurements are performed (at 216) by the secondary management device 200 to produce additional secondary measurement values as additional code segments are executed in the secondary management device 200. The primary management device extends (at 218) the additional primary measurement values to a respective PCR of the management TPM 126.

The additional secondary measurement values produced from the additional integrity measurements in the secondary management device 200 are sent (at 220) to the primary management device 120. The primary management device 120 extends (at 222) the additional secondary measurement values produced to a respective PCR of the management TPM 126.

Since a PCR value in a PCR for a given management device is based on multiple measurement values extended to the PCR, the PCR value constitutes a representation of the history of all measurement values extended into the PCR for the given management device.

The primary management device 12 further updates (at 224) the event log 138 with additional entries including the additional primary measurement values and the additional secondary measurement values, along with information identifying the management devices associated with the additional primary measurement values and the additional secondary measurement values.

Once the startup process is complete and the management domain 104 including multiple management devices has transitioned to a runtime state (a state after firmware has been executed, for example), the primary management device 120 issues (at 226) a PCR save command to the management TPM 126, which causes the management TPM 126 to save (at 228) the latest PCR values in the PCRs 170 to the persistent PCR record 136 in the persistent memory 128 of the management TPM 126.

When a verifier (e.g., the local verifier 160 or the remote verifier 162) performs attestations of the primary and secondary management devices, the verifier obtains the PCR values for the primary and secondary management devices from corresponding PCRs 170 in the management TPM 126. For example, a PCR value can be included in a PCR quote, which is a PCR value (in a PCR) signed using a digital signature by the management TPM 126. The PCR quote (or more generally, a security processor protection value) can be provided with an attestation request from the computer system 100 to the verifier.

The verifier compares the retrieved PCR value for each management device to a corresponding value in a database of the verifier. If the retrieved PCR value matches the corresponding value in the database, then that indicates that the machine-readable instructions of the management device have not been altered and thus can be trusted. The verifier sends an indication to an enforcement entity 163 regarding whether or not the management device is trustworthy. The enforcement entity 163 can be outside the computer system 100 or can be part of the computer system 100. If the indication indicates that the management device is trustworthy, the enforcement entity 163 allows use of the management device. If the verifier indicates that the management device is not trustworthy (e.g., because the machine-readable instructions of the management device have been altered), then the enforcement entity 163 can issue an alert that causes the computer system 100 to disable use of the management device. The enforcement entity 163 can include a program or an electronic device that applies an enforcement policy based on results returned by the verifier.

Figure 4:
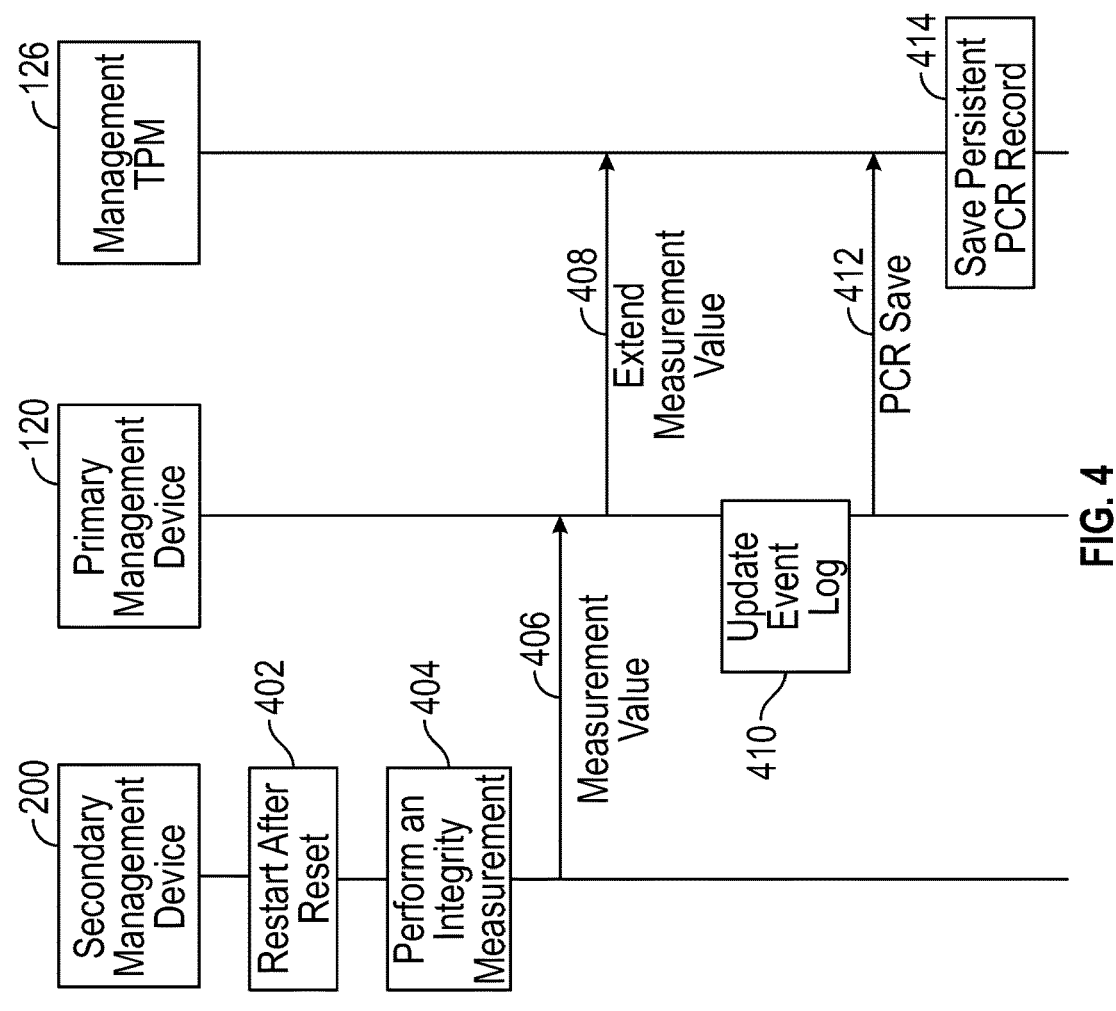
FIG. 3 and FIG. 4 are flow diagrams of processes of resuming after a reset of a management device, according to some examples.
Figure 3:
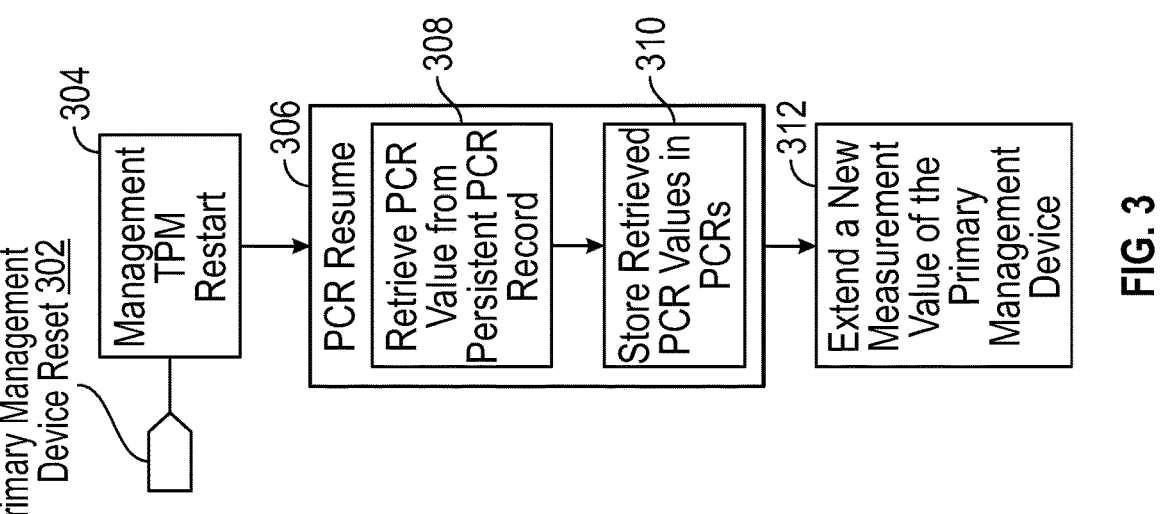

FIG. 3 and FIG. 4 are flow diagrams of processes of recovering from resets in the management domain 104 during a runtime state of the management domain 104. In some examples, there are several categories of management devices. A first category of management devices includes management devices that can be reset without impacting the OS 114 that executes in the host domain 102. In other words, a reset of a management device of the first category does not affect the operation of the OS 114.

A second category of management devices are those that cannot be reset without impacting the OS 114. An example of such a management device in the second category is a secondary management device that supports management of a file system for the OS 114. If the secondary management device resets, then the file system may become unavailable or may otherwise be in an indefinite state, which can lead to the OS 114 being unable to access or trust the state of the file system.

FIG. 3 is a flow diagram of a recovery process from a reset of the primary management device 120 in the first category. A reset (302) of the primary management device 120 results in a reset of the management TPM 126. The reset of the management TPM 126 causes a restart (304) of the management TPM 126.

In response to the restart of the management TPM 126, the management TPM 126 performs (at 306) a PCR resume operation that includes retrieving (at 308) PCR values for the secondary management devices that were saved into the persistent PCR record 136 (e.g., task 226 in FIG. 2). The persistent PCR record 136 includes entries containing PCR values for the secondary management devices, along with information identifying the secondary management devices. The management TPM 126 can determine based on the information identifying the secondary management devices which entries of the persistent PCR record 136 contains the PCR values for the secondary management devices.

The management TPM 126 stores (at 310) the retrieved PCR values for the secondary management devices into corresponding PCRs (e.g., PCRs 2 and 3). In this way, correct PCR values for the secondary management devices at the time of the reset of the management TPM 126 can be recovered into the PCRs for the secondary management devices. Note that extending a latest measurement value from a given secondary management device after the reset of the management TPM 126 may lead to a different value being stored in the PCR for the given secondary management device (i.e., the value is different from the saved PCR value for the given secondary management device saved to the persistent PCR record 136). This is because a value stored in a PCR is based on a combination of a current PCR value and the latest measurement value (e.g., according to Eq. 1 above). Due to the reset of the management TPM 126, the current PCR value for the given secondary management device is reset to zero. A combination of the latest measurement value with zero would lead to a different PCR value than a combination of the latest measurement value with a non-zero value (the PCR value saved in the persistent PCR record 136 for the given secondary management device may have been generated based on the latest measurement value and a previous non-zero value saved to the PCR).

In a specific example, prior to the reset of the primary management device 120 (and thus prior to the reset of the management TPM 126), the PCR for the given secondary management device stores a PCR value that is based on a combination of the latest measurement value (M-latest) and a previous PCR value (P-previous) of the PCR. After the reset of the management TPM 126 that results in the PCR being reset to zero, a PCR value for the PCR would be computed based on a combination of M-latest and zero, which would be different from the PCR value computed based on the combination of M-latest and P-previous.

The management TPM 126 further extends (at 308) a new measurement value of the primary management device 120 in a respective PCR for the primary management device 120. For example, after the primary management device 120 has restarted following the reset of the primary management device 120, the primary management device 120 can perform an integrity measurement to obtain the new measurement value and issue an extend command to extend the new measurement value to the respective PCR for the primary management device 120.

FIG. 4 is a flow diagram of a recovery process from a reset of a secondary management device 200 (any of 121 to 124) in the first category or the second category. Note that the reset of the secondary management device 200 does not cause a reset of the management TPM 126. Therefore, the content of the PCRs for the primary and secondary management devices remains intact in the management TPM 126 (i.e., the PCRs the primary and secondary management devices are not reset, such as to zero).

The secondary management device 200 restarts (at 402) after the reset of the secondary management device 200. In response to the restart, the RoT engine in the secondary management device 200 performs (at 404) an integrity measurement to generate a new measurement value for the secondary management device 200. The secondary management device 200 sends (at 406) the new measurement value to the primary management device 120 over a link protected by a secure communications protocol. In some examples, the secondary management device 200 may push the new measurement value to the primary management device 120 (without any specific request from the primary management device 120). In other examples, the primary management device 120 may issue a request to obtain the new measurement value from the secondary management device 200, such as in response to detecting by the primary management device 120 that the secondary management device 200 has reset.

The primary management device 120 extends (at 408) the new measurement value to the PCR for the secondary management device 200. Note that the current PCR value in the PCR for the secondary management device 200 is a non-zero value because the PCR has maintained the current PCR value for the secondary management device 200 even though the secondary management device 200 has reset. Normally, it is expected that a reset of a management device would result in the PCR value for a management device to be initialized (such as to zero). However, because the secondary management device 200 is in a reset domain different from the reset domain of the primary management device 120, the reset of the secondary management device 200 does not cause a reset of the PCR value for the secondary management device 200.

Extending (at 408) the new measurement value to the PCR that contains a non-zero value would result in a different PCR value being stored in the PCR than if the new measurement value were extended to the PCR that contains a zero value.

As additional measurement values are generated by the secondary management device 200 as successive code segments are executed, the additional measurement values are also sent to the primary management device 120, which extends the additional measurement values to the management TPM 126.

The primary management device 120 updates (at 410) the event log 138 with entries containing the measurement values for the secondary management device 200.

Once the restart of the secondary management device 200 is complete (and all measurement values of the secondary management device 200 have been extended to the management TPM 126), the primary management device 120 issues (at 412) a PCR save command to the management TPM 126, which causes the management TPM 126 to save (at 414) the latest PCR values in the PCRs 170 to the persistent PCR record 136 in the persistent memory 128 of the management TPM 126.

During attestation of the secondary management device 200 by a verifier (e.g., the local verifier 160 or the remote verifier 162), the verifier retrieves the PCR value for the secondary management device 200 from a corresponding PCR 170 in the management TPM 126. The verifier compares the retrieved PCR value for the secondary management device 200 to a corresponding value in the database of the verifier. Because the PCR value for the secondary management device 200 that has been reset independently of the management TPM 126 is different from the PCR value for the secondary management device 200 if the secondary management device 200 had not been reset independently of the management TPM 126, the verifier would detect a mismatch between the PCR value for the secondary management device 200 and the corresponding value in the database of the verifier. Rather than indicate an attestation failure of the secondary management device 200, the verifier can access the event log 138 to compare individual measurement values for the secondary management device 200 before and after the reset of the secondary management device 200. This allows the verifier to confirm whether or not the machine-readable instructions of the secondary management device 200 have been altered. If the individual measurement values for the secondary management device 200 before and after the reset of the secondary management device 200 remain the same, then the verifier can confirm that the machine-readable instructions of the secondary management device 200 have not been altered and thus the secondary management device 200 can be trusted.

Figure 5:
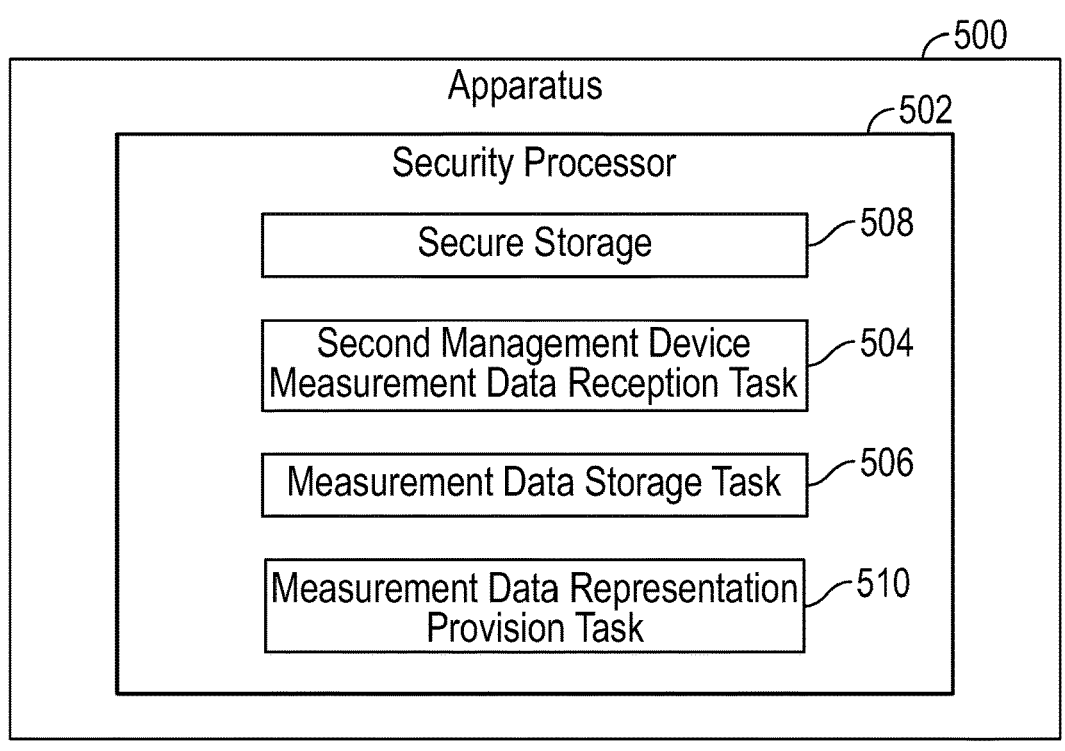
FIG. 5 is a block diagram of an apparatus according to some examples.

FIG. 5 is a block diagram of an apparatus 500 according to some examples. The apparatus 500 can include the management domain 104 of FIG. 1, for example. The apparatus 500 can be part of a computer system 100, or alternatively, the apparatus 500 can include the entirety of the computer system 100.

The apparatus 500 includes a security processor 502 to perform various tasks. For example, the security processor 502 can execute instructions that perform the tasks. Alternatively, hardware processing circuitry of the security processor 502 performs the tasks.

The tasks of the security processor 502 include a second management device measurement data reception task 504 that receives, at the security processor 502 from a first management device, measurement data of a second management device. The measurement data is computed at the second management device based on information (e.g., program code) in the second management device, and the measurement data is sent from the second management device to the first management device. In some examples, the measurement data includes a cryptographic hash value based on program code executed in the second management device.

The first and second management devices perform respective different system management operations in a computer system, and the first and second management devices are separate from a CPU that executes an OS of the computer system.

The tasks of the security processor 502 include a measurement data storage task 506 to store the measurement data in a secure storage 508 of the security processor 502. The secure storage 508 can include a register, such as a PCR of a TPM. In other examples, the secure storage 508 can be implemented with another type of storage. The secure storage 508 is "secure" in the sense that the security processor 502 includes mechanisms to prevent unauthorized access of the secure storage 508.

The tasks of the security processor 502 include a measurement data representation provision task 510 to provide a representation of the measurement data to validate an integrity of the information in the second management device. The representation of the measurement data can be provided by the security processor 502 to a verifier. In some examples, the representation of the measurement data is in the form of a PCR quote. In some examples, the security processor 502 provides the representation of the measurement data as part of an attestation process to verify a trustworthiness of the second management device.

In some examples, the security processor 502 receives, from the first management device, measurement data of the first management device, and the security processor 502 stores the measurement data of the first management device in a further secure storage (e.g., a PCR) of the security processor.

In some examples, the secure storage 508 includes a first register of the security processor 502. The security processor 502 extends the measurement data to the first register.

In some examples, the security processor 502 receives, from the first management device, measurement data of the first management device. The security processor 502 extends the measurement data of the first management device to a second register of the security processor, where the second register is different from the first register.

In some examples, the security processor 502 receives, from the first management device, a command to save a content of the secure storage to a persistent record (e.g., 136 in FIG. 1) that is available after a reset of the security processor.

In some examples, after the reset of the security processor 502, the security processor 502 re-populates the measurement data back to the secure storage from the persistent record.

In some examples, the security processor 502 is reset in response to a reset of the first management device, and the security processor 502 does not reset in response to a reset of the second management device.

In some examples, the first management device and the second management device are in different reset domains. The security processor 502 receives, from the first management device, refreshed measurement data of the second management device after a reset of the second management device.

In some examples, the refreshed measurement data of the second management device is obtained by the first management device based on the first management device detecting the reset of the second management device.

Figure 6:
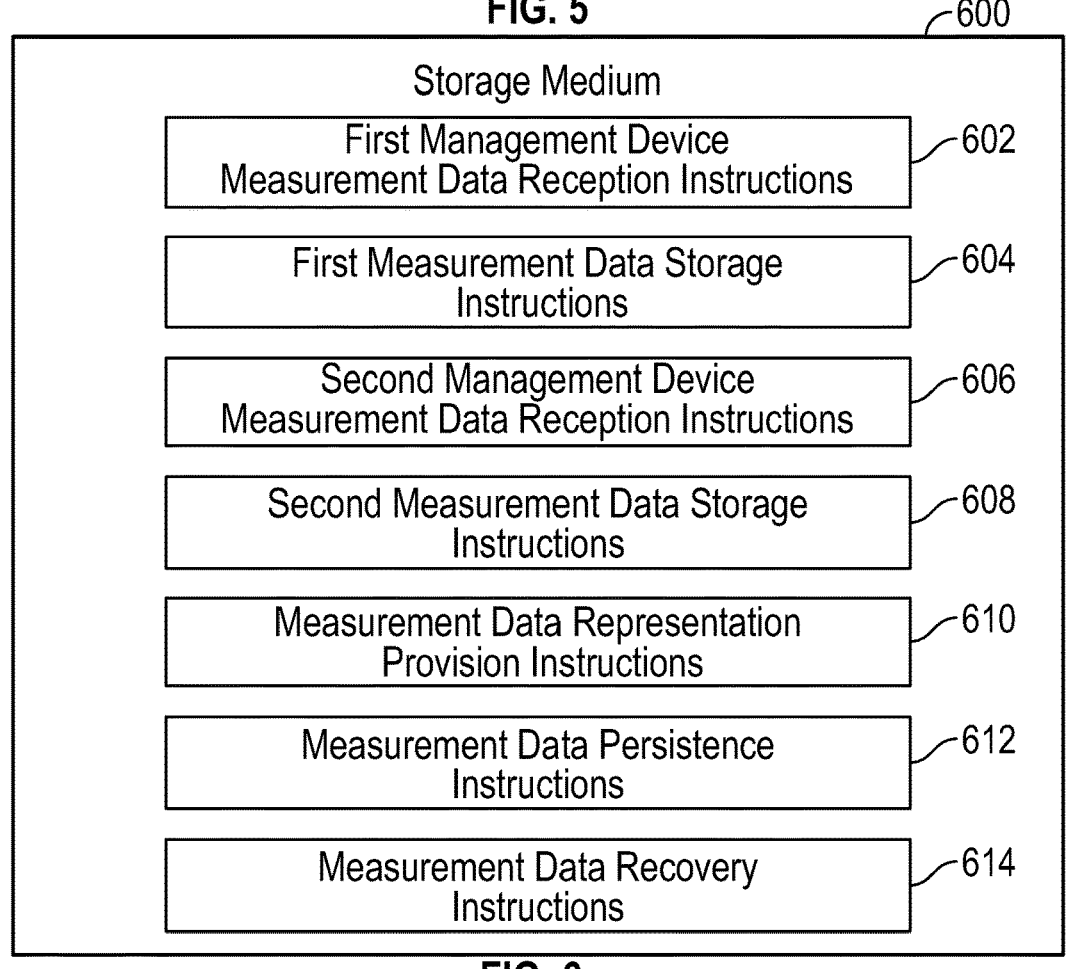
FIG. 6 is a block diagram of a storage medium storing machine-readable instructions according to some examples.

FIG. 6 is a block diagram of a non-transitory machine-readable or computer-readable storage medium 600 storing machine-readable instructions that upon execution cause a security processor to perform various tasks.

The machine-readable instructions include first management device measurement data reception instructions 602 to receive, at the security processor from a first management device in a first reset domain, first measurement data that is based on program code in the first management device.

The machine-readable instructions include first measurement data storage instructions 604 to store the first measurement data in a first register of the security processor. For example, the first measurement data storage instructions 604 extend the first measurement data to a first PCR of a TPM, such as the management TPM 126 of FIG. 1.

The machine-readable instructions include second management device measurement data reception instructions 606 to receive, at the security processor from the first management device, second measurement data that is based on program code in a second management device. The second management device is in a second reset domain different from the first reset domain.

The machine-readable instructions include second measurement data storage instructions 608 to store the second measurement data in a second register of the security processor. For example, the second measurement data storage instructions 608 extend the second measurement data to a second PCR of a TPM, such as the management TPM 126 of FIG. 1.

The machine-readable instructions include measurement data representation provision instructions 610 to provide a representation of the first measurement data to validate an integrity of the program code in the first management device, and provide a representation of the second measurement data to validate an integrity of the program code in the second management device. The representations of the first and second measurement data can include PCR quotes in some examples.

The machine-readable instructions include measurement data persistence instructions 612 to store, in a persistent memory of the security processor, the second measurement data. For example, the second measurement data can be saved in the persistent PCR record 136 of FIG. 1 in response to a save command from the first management device.

The machine-readable instructions include measurement data recovery instructions 614 to, in response to a reset of the security processor caused by a reset of the first management device, recover the second measurement data from the persistent memory and save the recovered second measurement data to the second register.

In some examples, the security processor interacts directly with the first management device, and the security processor is without a link to the second management device. For example, the first management device includes an interface (e.g., the TPM interface 166 of FIG. 1) that allows the first management device to issue commands or otherwise communicate with the security processor. The second management device, on the other hand, does not include any interface to the security processor. Rather, the second management device sends information (e.g., measurement data) to the first management device, which in turn forwards the measurement device to the security processor.

FIG. 7 is a flow diagram of a process 700 according to some examples. The process 700 can be performed in a management domain of a computer system, cush as the management domain 104 of FIG. 1.

The process 700 includes receiving (at 702), at a first management device in a first reset domain from a second management device in a second reset domain, measurement data computed at the second management device based on program code in the second management device. The measurement data can include a hash value derived from applying a cryptographic hash function on the program code (or a segment of the program code) in the second management device.

The process 700 includes sending (at 704), by the first management device, an extend command to extend the measurement data of the second management device to a register of a security processor. The security processor can be a TPM, and the register can be a PCR of the TPM.

The process 700 includes extending (at 706), based on the command, the measurement data of the second management device to the register of the security processor. Extending measurement data to the register refers to computing a value based on the measurement data and a value currently in the register.

The process 700 includes sending (at 708), by the first management device, a save command to persistently save the measurement data of the second management device to a persistent memory of the security processor. The measurement data of the second management device saved to the persistent memory is available after a reset of the security processor.

As noted above, the management devices 120 to 124 of the management domain 104 in FIG. 1 can perform various different management operations in the computer system 100. In some examples, a management device includes a BMC, which is a specialized service controller that monitors the physical state of a computer system using sensors and communicates with a remote management system (that is remote from the computer system) through an independent "out-of-band" connection. The BMC can perform management tasks to manage components of the computer system. Examples of management tasks that can be performed by the BMC can include any or some combination of the following: power control to perform power management of the computer system (such as to transition the computer system between different power consumption states in response to detected events), thermal monitoring and control of the computer system (such as to monitor temperatures of the computer system and to control thermal management states of the computer system), fan control of fans in the computer system, system health monitoring based on monitoring measurement data from various sensors of the computer system, remote access of the computer system (to access the computer system over a network, for example), remote reboot of the computer system (to trigger the computer system to reboot using a remote command), system setup and deployment of the computer system, system security to implement security procedures in the computer system, and so forth.

In further examples, a management device can be a different type of management device, which can perform any or some combination of the following management tasks: manage a network or another communication link between parts of a computer system, such as between servers or system boards, coordinate management of multiple parts of the computer system, define clusters of nodes, and so forth.

A storage medium (e.g., 600 in FIG. 6) can include any or some combination of the following: a semiconductor memory device such as a DRAM or SRAM, an EPROM, an EEPROM, and a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:

a security processor to:

receive, at the security processor from a first management device, measurement data from a second management device, the measurement data computed at the second management device based on information in the second management device and sent from the second management device to the first management device, wherein the first and second management devices are to perform respective different system management operations in a computer system, and the first and second management devices are separate from a central processing unit (CPU) that executes an operating system (OS) of the computer system;

store the measurement data in a secure storage of the security processor, wherein the first and second management device are in different reset domains, such that, a reset of the first management device triggers a reset of the security processor, wherein a command is thereafter received from the first management device to save a content of the secure storage to a persistent record, and the measurement data is re-populated back to the secure storage from the persistent record, and a reset of the second management device does not cause a reset of the second management device and causes the first management device to receive refreshed measurement data of the second management device; and provide a representation of the measurement data to validate an integrity of the information in the second management device.

2. The apparatus of claim 1, wherein the security processor is to:

receive, from the first management device, measurement data of the first management device; and store the measurement data of the first management device in a further secure storage of the security processor.

3. The apparatus of claim 1, wherein the security processor is to provide the representation of the measurement data as part of an attestation process to verify a trustworthiness of the second management device.

4. The apparatus of claim 3, wherein the measurement data comprises a cryptographic hash value based on program code executed in the second management device.

5. The apparatus of claim 1, wherein the secure storage comprises a first register of the security processor, and the security processor is to extend the measurement data to the first register.

6. The apparatus of claim 5, wherein the security processor is to:

receive, from the first management device, measurement data of the first management device; and extend the measurement data of the first management device to a second register of the security processor, wherein the second register is different from the first register.

7. The apparatus of claim 1, wherein the refreshed measurement data of the second management device is obtained by the first management device based on the first management device detecting the reset of the second management device.

8. The apparatus of claim 1, wherein the security processor is to:

send the representation of the measurement data to a verifier that sends, based on the representation of the measurement data, an indication of whether the second management device is trustworthy to an enforcement entity.

9. A non-transitory machine-readable storage medium comprising instructions that upon execution cause a security processor to:

receive, at the security processor from a first management device in a first reset domain, first measurement data that is based on program code in the first management device;

store the first measurement data in a first register of the security processor;

receive, at the security processor from the first management device, second measurement data that is based on program code in a second management device, the second management device being in a second reset domain different from the first reset domain;

store the second measurement data in a second register of the security processor;

provide a representation of the first measurement data to validate an integrity of the program code in the first management device, and provide a representation of the second measurement data to validate an integrity of the program code in the second management device;

store, in a persistent memory of the security processor, the second measurement data; and in response to a reset of the security processor caused by a reset of the first management device, recover the second measurement data from the persistent memory and save the recovered second measurement data to the second register.

10. The non-transitory machine-readable storage medium of claim 9, wherein a reset of the second management device in the second reset domain does not cause a reset of the security processor.

11. The non-transitory machine-readable storage medium of claim 9, wherein the security processor stores the second measurement data in the persistent memory of the security processor in response to a command to save a content of the second register received from the first management device.

12. The non-transitory machine-readable storage medium of claim 9, wherein the security processor is to interact directly with the first management device, and the security processor is without a link to the second management device.

13. The non-transitory machine-readable storage medium of claim 9, wherein the instructions upon execution cause the security processor to:

after the reset of the security processor caused by the reset of the first management device, receive, at the security processor from the first management device, new measurement data of the first management device.

14. A method comprising:

receiving, at a first management device in a first reset domain from a second management device in a second reset domain, measurement data computed at the second management device based on program code in the second management device;

sending, by the first management device, an extend command to extend the measurement data of the second management device to a register of a security processor;

based on the extend command, extending the measurement data of the second management device to the register of the security processor, the measurement data in the register for validating an integrity of the second management device;

sending, by the first management device, a save command to persistently save the measurement data of the second management device to a persistent memory of the security processor, wherein the measurement data of the second management device saved to the persistent memory is available after a reset of the security processor; and updating, by the first management device, an event log with an entry containing the measurement data for the second management device, wherein the event log is accessible by a verifier to confirm that the program code of the second management device has not been altered.

* * * * *